(12) United States Patent
Stenfelt et al.

(10) Patent No.: US 8,995,340 B2
(45) Date of Patent: Mar. 31, 2015

(54) DEVICES FOR VARIABLE TRAFFIC FLOW TEMPLATES

(75) Inventors: John Stenfelt, Gothenburg (SE);
Fredrik Garneij, Gothenburg (SE);
Lars Gunnar Lovsen, Gothenburg (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 101 days.

(21) Appl. No.: 13/509,845

(22) PCT Filed: Nov. 16, 2009

(86) PCT No.: PCT/EP2009/008140
§ 371 (c)(1),
(2), (4) Date: May 15, 2012

(87) PCT Pub. No.: WO2011/057655
PCT Pub. Date: May 19, 2011

(65) Prior Publication Data
US 2012/0224539 A1    Sep. 6, 2012

(51) Int. Cl.
*H04W 28/02* (2009.01)
*H04W 28/16* (2009.01)
*H04W 76/02* (2009.01)
*H04W 80/04* (2009.01)

(52) U.S. Cl.
CPC ........... *H04W 28/16* (2013.01); *H04W 76/022* (2013.01); *H04W 80/045* (2013.01)
USPC ......................................... 370/328; 370/411

(58) Field of Classification Search
USPC ......................................... 370/310, 328, 411
See application file for complete search history.

(56) References Cited

U.S. PATENT DOCUMENTS

| 7,860,073 | B2* | 12/2010 | Chen | 370/338 |
|---|---|---|---|---|
| 7,873,003 | B2* | 1/2011 | Baek et al. | 370/329 |
| 8,064,384 | B2* | 11/2011 | Chen et al. | 370/328 |
| 8,064,395 | B2* | 11/2011 | Gasparroni et al. | 370/329 |
| 8,094,644 | B2* | 1/2012 | Ludwig et al. | 370/349 |
| 8,437,358 | B2* | 5/2013 | Shin et al. | 370/415 |
| 2008/0153454 | A1* | 6/2008 | Haapapuro et al. | 455/404.1 |
| 2009/0016344 | A1* | 1/2009 | Hu et al. | 370/389 |
| 2010/0027448 | A1* | 2/2010 | Puthiyandyil et al. | 370/310 |
| 2012/0026933 | A1* | 2/2012 | Aso et al. | 370/315 |
| 2012/0147839 | A1* | 6/2012 | Yin et al. | 370/329 |

OTHER PUBLICATIONS

3GPP, "3rd Generation Partnership Project; Technical Specification Group Services and System Aspects; General Packet Radio Service (GPRS); Service Description; Stage 2 (Release 9)", 3GPP TS 23.060 V9.0.0, Mar. 2009, 275 pages.

(Continued)

*Primary Examiner* — Phuc Tran
(74) *Attorney, Agent, or Firm* — Rothwell, Figg, Ernst & Manbeck, P.C.

(57) ABSTRACT

The invention discloses a user terminal (115) for a wireless communications system (100) which is arranged to establish and carry out a communications session with a gateway node (120) in the system (100) according to a first protocol over at least one bearer (110, 140). The user terminal (115) is arranged to provide a predefined issued message to the gateway node (120) during the establishment of a session with an indicator that the user terminal (115) is arranged to handle traffic to and from the gateway node (120) using a predefined version of a defined filter (130).

9 Claims, 4 Drawing Sheets

(56) References Cited

OTHER PUBLICATIONS

3GPP, "Enabling Dual Stack PDP Contexts for Gn/Gp SGSNs and GGSNs", 3GPP TSG-SA2 Meeting #73, Tallinn Estonia, May 11-15, 2009, S2-093934, 23.060 CR 0858, Rev1, 9.0.0, 12 pages.

3GPP, "Correct Dual Stack Support in GTPv1", 3GPP TSG CT4 Meeting #46, Pheonix, USA, Oct. 1-16, 2009, C4-093182, 29.060 CR 0729, Rev1, 9.0.0, 22 pages.

* cited by examiner

DEVICES FOR VARIABLE TRAFFIC FLOW TEMPLATES

CROSS REFERENCE TO RELATED APPLICATION(S)

This application is a 35 U.S.C. §371 National Phase Entry Application from PCT/EP2009/008140 filed Nov. 16, 2009, designating the United States, the disclosure of which is incorporated by reference herein in its entirety.

TECHNICAL FIELD

The present invention discloses a user terminal and a gateway node in a wireless communications system for variable traffic flow templates, TFTs.

BACKGROUND

In wireless communications systems such as, for example, the 2G/3G GPRS system, i.e. the General Packet Radio System, and the Evolved Packet System, EPS, the systems are arranged for communication between a gateway node and one or more user terminals. In GPRS systems, the gateway node is known as the GGSN, the Gateway GPRS Support Node, and in EPS systems, the gateway node is known as the PDN-GW, the Packet Data Network Gateway.

The communication between the gateway node and the user terminal takes place over a so called a Packet Data Network connection, a PDN connection, over one or more so called bearer, an IP-CAN bearer, IP-Connectivity Access Network bearer, and the gateway node uses a function known as the BBF, the Bearer Binding Function, to identify which bearer that a specific downlink packet should be transmitted via. The BBF in turn uses a filter known as the TFT, Traffic Flow Template, in order to "bind" packets" to the proper bearer.

The term "bearer" here refers to a logical IP transmission path between a user terminal and the network with a specific Quality of Service, QoS properties such as, for example, capacity, delay, packet loss error rate etc.

For GPRS systems, the IP-CAN bearer is a PDP-context (Packet Data Protocol), and for EPS systems it is an EPS bearer.

The TFT is used by the so called Bearer Binding Function, BBF, in a gateway node in the system to bind downlink IP-packets to the existing bearers of a PDN connection, and might also be used to perform uplink bearer verification, i.e. to make sure that a user terminal doesn't send data packets using the wrong bearer.

In GPRS applications, the BBF is located in the GGSN, the Gateway GPRS Support Node, and in EPS applications, the BBF is located in a gateway GW node, a GW node, such as, for example, the PDN-GW, Packet Data Network GW, or the Serving GW for 3GPP accesses, or in the Access GW for non-3GPP based access.

It can be noted that the term Bearer Binding Function is normally only used in 3GPP specifications related to PCC, Policy and Charging Control. However, the term is used here in order to reference the entity or function that encompasses the functionality involved in setting up and managing bearers in the applicable architecture i.e. the GGSN for GPRS, the PDN-GW for GTP-based EPC, the Serving GW for 3GPP access via a PMIP-based EPC or the Access GW for non-3GPP access via PMIP-based EPC.

SUMMARY

It is an object of the present invention to provide improved functionality in the connection between a user terminal and a gateway node in a system such as those described above. The improved functionality should allow for the use of multiple various versions of a signaling protocol, and should also be backwards compatible, i.e. it should not exclude equipment which cannot handle newer versions of a certain protocol.

Such improved functionality is offered by the present invention in that it discloses a user terminal for a wireless communications system which is arranged to establish and carry out a communications session with a gateway node in the system according to a first protocol over at least one bearer.

The user terminal of the invention is arranged to provide a predefined message to the gateway node during the establishment of a session with an indicator that the user terminal is arranged to handle traffic to and from the gateway node using a predefined version of a defined filter.

In one embodiment, the user terminal of the invention is arranged to also receive a response from the gateway node to the predefined message, and the user terminal is also arranged to identify an indicator in this response, the indicator indicating that the gateway node can transmit and receive messages according to said defined filter. In this embodiment, the user terminal is arranged to format messages it sends to the gateway node according to a predefined other version of the filter if the indicator is missing.

In one embodiment of the user terminal of the invention, the first protocol is the IP-protocol, the Internet Protocol, the predefined message is the PCO, the Protocol Configuration Options, and the defined filter is the TFT, Traffic Flow Template.

In one embodiment, the user terminal of the invention is a UE, a User Equipment, of an EPS system, an Evolved Packet system.

In one embodiment, the user terminal of the invention is an MS, a Mobile Station, of a GPRS system, a General Packet Radio Service system.

In addition to the user terminal described above, the invention also discloses a gateway node for a wireless communications system, which is arranged to establish and carry out a communications session according to a first protocol with a user terminal in the system over at least one bearer.

The gateway node of the invention is equipped with a function for choosing the proper bearer for messages to the user terminal, and is arranged to receive an indicator in a predefined message from the user terminal during the establishment of a session. If this indicator is received, the gateway node of the invention is arranged to use a predefined version of a defined filter when choosing the proper bearer.

In one embodiment of the gateway node of the invention, the first protocol is the IP-protocol, the Internet Protocol, the predefined message is the PCO, the Protocol Configuration Options and the defined filter is the TFT, Traffic Flow Template.

In one embodiment of the gateway node of the invention, the function for choosing the proper bearer is the Bearer Binding Function.

In one embodiment, the gateway node of the invention is a PDN-GW, a Packet Data Network Gateway, for an EPS system, an Evolved Packet System.

In one embodiment, the gateway node of the invention is a GGSN, a Gateway GPRS Support Node, for a GPRS system, a General Packet Radio System.

BRIEF DESCRIPTION OF THE DRAWINGS

The invention will be described in more detail in the following, with reference to the appended drawings, in which.

DETAILED DESCRIPTION

Figure 1:
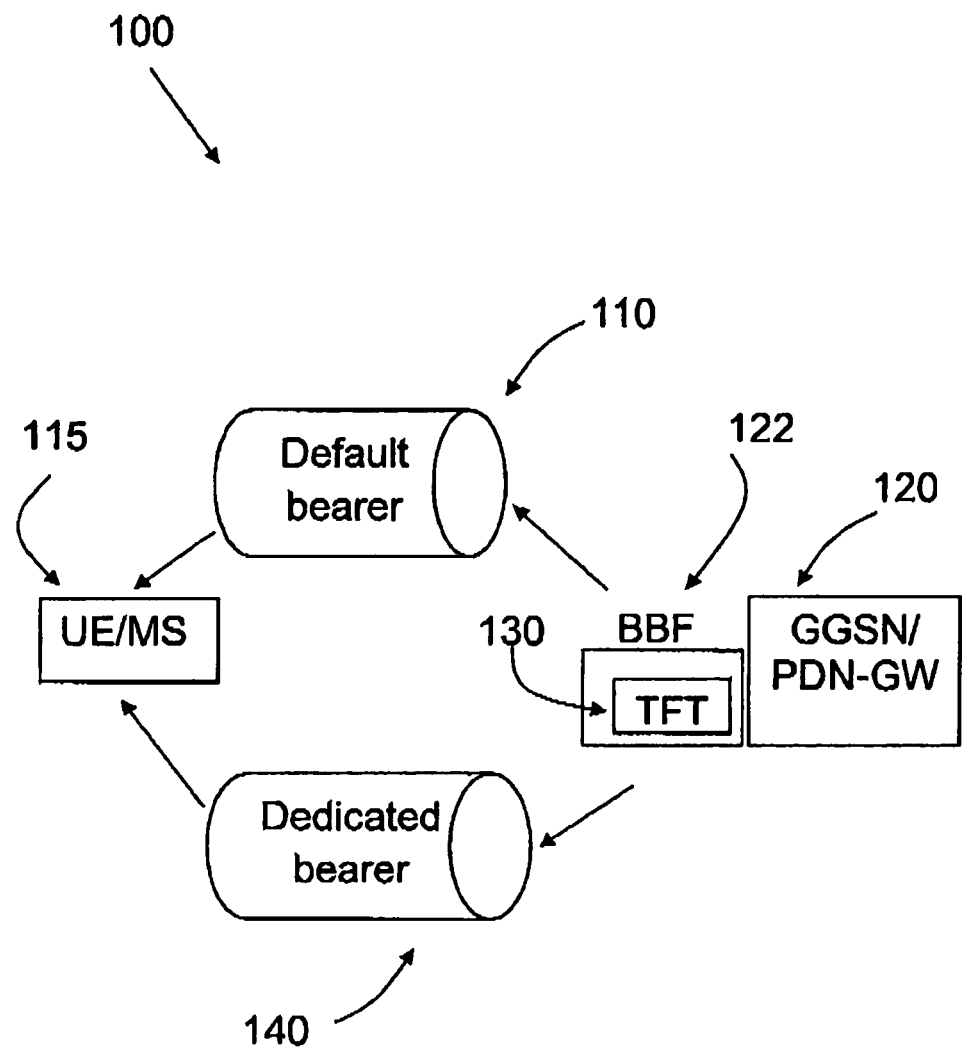
FIG. 1 shows a schematic overview of some of the components in a system in which the invention is applied.

FIG. 1 shows an example of a system 100 in which the invention is applicable: in the system 100, there is a user terminal 115, shown both as a UE/MS, since the invention can be applied both in GPRS systems, General Packet Radio Service system, in which the user terminals are referred to as a UE, User Equipment, and in EPS systems, Evolved Packet System, in which the user terminals are referred to as an MS, a Mobile Station.

The UE/MS communicates with a node 120 known as the GGSN in the GPRS case or the PDN-GW in the EPS case. These abbreviations stand for the following:

GGSN: Gateway GPRS Support Node,
PDN-GW, Packet Data Network GW.

The communication between the UE/MS 115 and the GGSN/PDN-GW 120 takes place over so called bearers, two of which are shown, a default bearer 110 and a dedicated bearer 140. As the name implies, the dedicated bearer 140 is dedicated to a certain kind of traffic or service between the UE/MS and the GGSN/PDN-GW, examples of such traffic or services being voice or streaming of data. The default bearer 110 is used for traffic for which there is no suitable dedicated bearer.

In order to direct traffic and or data to the UE/MS 115 via the correct bearer, the GGSN/PDN-GW utilizes a function 122 known as BBF, the Bearer Binding Function, which in turn utilizes so called Traffic Flow Templates, TFTs, shown as 130 in FIG. 1. The TFT comprises a number of parameters in order to direct the traffic to the correct bearer, one such parameter being the IP address of the "target" UE/MS.

The communication between a so called remote endpoint node and the UE/MS 115, via the gateway node 120, takes place according to the IP-protocol, i.e. the Internet Protocol. There are different versions of the IP-protocol, one of which is version 6, i.e. IPv6, in which, as opposed to the previous version, i.e. IPv4, the address for the UE/MS comprises a prefix and an interface identifier. The full IPv6 address (prefix and interface identifier) is part of a new TFT format, in order to direct traffic to the proper bearer, due to the fact that multiple interface identifiers may be used by the UE/MS itself or devices on a network beyond the UE/MS. As opposed to this, IPv4 in present accesses only comprises one complete address, which is not part of the TFT filter, for the UE/MS. Thus, detailing the UE/MS address is only applicable if the gateway node is arranged to operate according to IPv6; if the gateway node is arranged to operate according to IPv4, there is no need for detailing the UE/MS address in the TFT filter further from what is already know for the UE/MS.

According to the invention, the UE/MS 115 can find out if the gateway 120 can use TFTs according to IPv6 or IPv4 in the following manner:

Introduce a new indicator into the Protocol Configuration Options, PCO, field that is sent from the MS/UE to the BBF when establishing a session, i.e. at the Primary PDP-context activation for 2G/3G GPRS systems, and in the Initial attach or UE Requested PDN connectivity procedure for EPS systems, the indicator signaling to the gateway that the MS/UE understands the new extended TFT definition according to IPv6 and is capable of originating TFT filters using the extended definition. If the gateway node, i.e. the BBF does not understand the indicator, the BBF will simply ignore the indicator, which is standard procedure with unknown messages or indicators.

Introduce in the response from the BBF to the MS/UE in the Primary PDP context activation procedure and in the Initial attach procedure a new indicator in the PCO field that informs an MS/UE that the network, i.e. the gateway node or in this case its BBF, supports the new TFT-format, i.e. that of IPv6. The network will use the new TFT format only if both the MS/UE indicated support for TFT extensions in the request and if the core network, i.e. in this case the BBF in the gateway node, supports the new TFT format.

In this manner, the introduction of the following additions to the existing TFT will be enabled in a manner that is fully backwards compatible:

Addition of the full local IPv6 address, possibly masked, to the list of TFT filter attributes;

Addition of the address type to the list of TFT filter attributes.

Thus, according to the invention, support in the UE/MS for TFT enhancements using the possibilities of IPv6 is indicated in the Protocol Configuration Options from the MS/UE to the BBF.

The inclusion of the indicator according to the invention from the UE/MS is used by the BBF to determine if the extended TFT format should be applied, or if the "legacy" TFT format should apply for the applicable PDN connection of a given UE/MS.

The inclusion of the indicator of the invention from the gateway node is used by the MS/UE 115 to determine if the extended TFT format should apply, or if the "legacy" TFT format should apply for the PDN connection.

The logic of the invention to indicate the use of TFT enhancements or not is applied when the indicator in the PCO field is provided for the procedures when the first PDN connection to an APN, Access Point Name, is established for a UE/MS. Procedures for which this is applicable are shown in table 1 below:

TABLE 1

| Procedure | Reference |
| --- | --- |
| PDP Context Activation Procedure for A/Gb | TS 23.060 |
| PDP Context Activation Procedure for Iu mode | TS 23.060 |
| PDP Context Activation Procedure steps (A) using S4 | TS 23.060 |
| E-UTRAN initial attach | TS 23.401 |
| UE Requested PDN connectivity | TS 23.401 |
| Initial E-UTRAN attach with PMIP-based S5 or S8 | TS 23.402 |
| UE Requested PDN connectivity with PMIP-based S5 or S8 | TS 23.402 |

For the case when a PMIPv6 (Proxy Mobile IP) based EPC (Evolved Packet Core) is deployed in the network, and the BBF is located in the Access GW/Serving GW (depending on whether the access is 3GPP or non-3GPP based), there is the possibility that the BBF may be relocated during the lifetime of the PDN connection, e.g. during Access GW/Serving GW relocation. For this particular case, it is considered a network configuration issue to ensure that the use of the extended TFT format is only indicated by the network at PDN connection establishment in the case that the extended format is supported by all BBFs in the network that the PDN connection may be relocated to.

Figure 2:
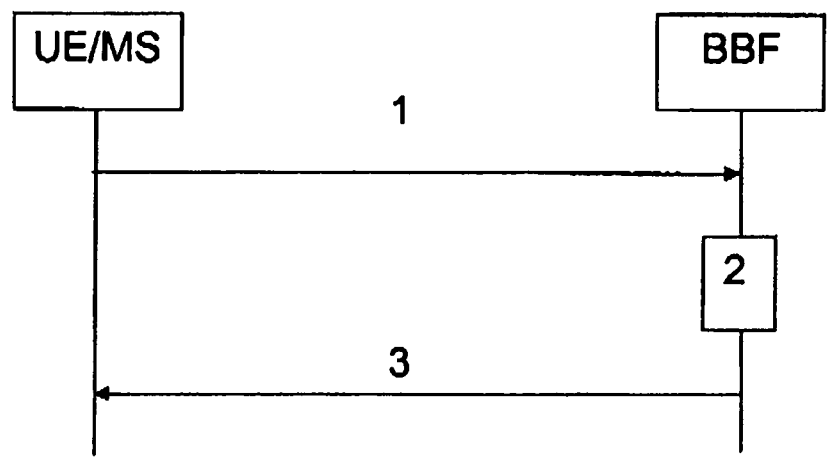
FIG. 2 shows a sequence diagram when the invention is used.
Figure 3:
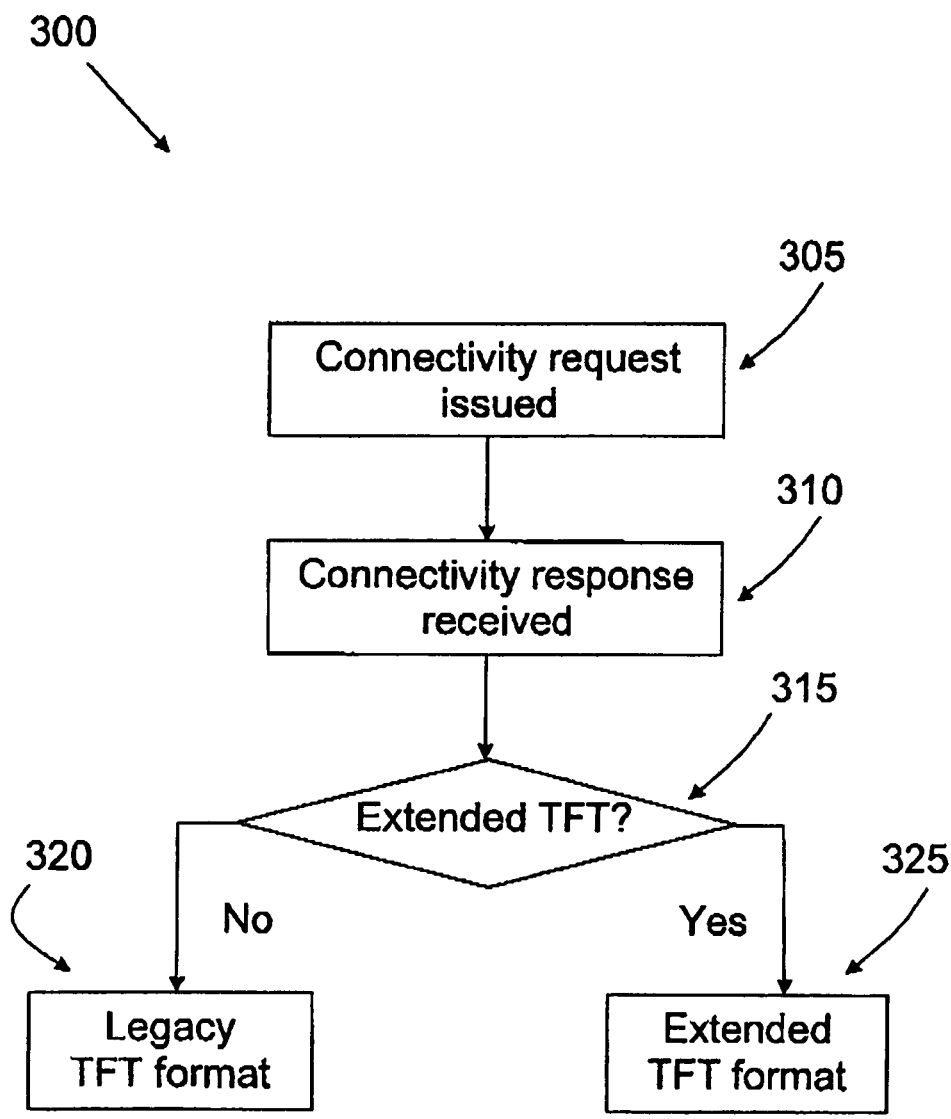
FIG. 3 shows a basic flow diagram in a UE/MS of the invention.
Figure 4:
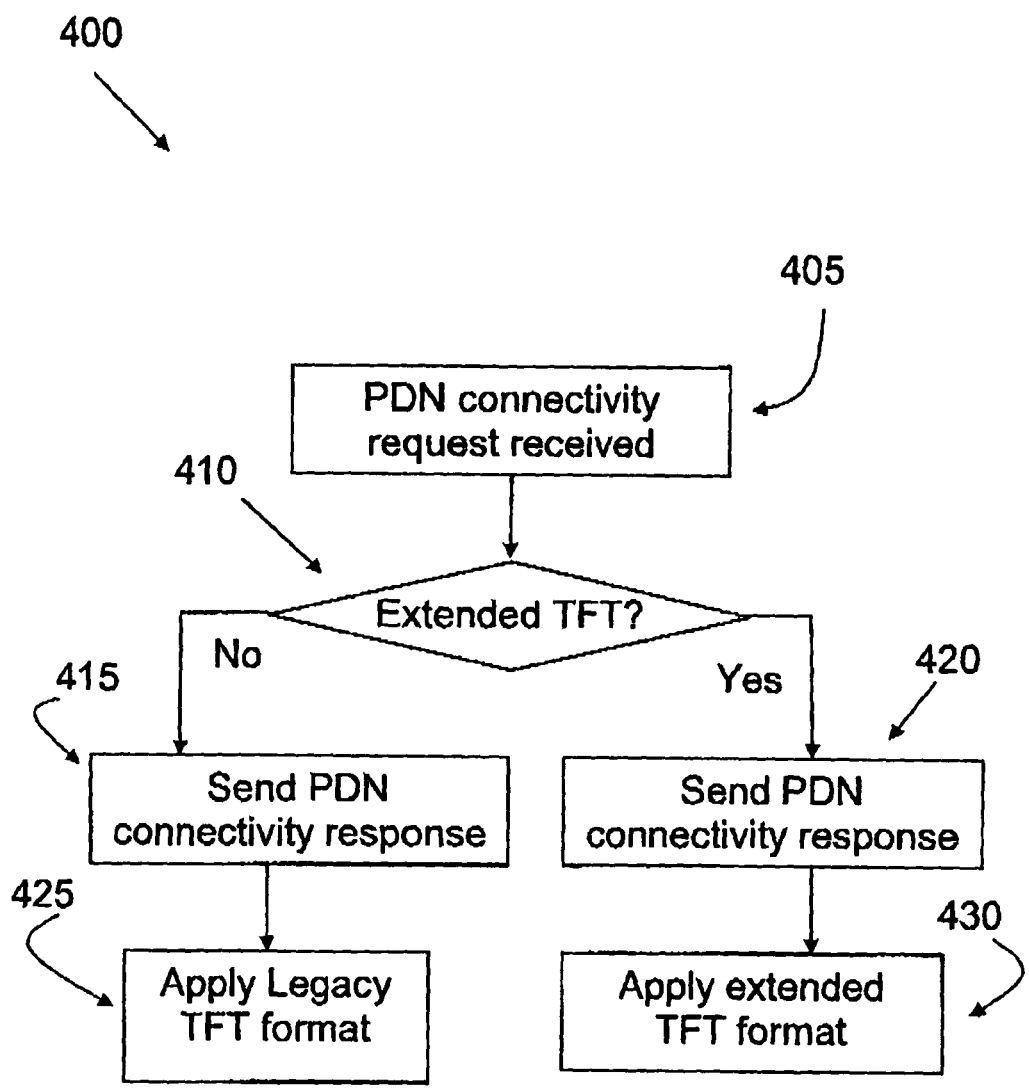
FIG. 4 shows a basic flow diagram in a BBF in a gateway of the invention.

FIGS. 2-4 show sequences and flow charts of the general case, i.e. the stationary case, when the BBF is not relocated. In those figs, the GW node can either be a GGSN or a PDN-GW, a Serving GW or an Access GW, depending on the scenario.

Turning now to FIG. 2, there is shown a general sequence diagram of the invention that is applicable for all of the procedures listed in table 1. Only the Non-Access Stratum, NAS, messages are shown in FIG. 2. The numbers below refer to the corresponding numbers shown in the sequence diagram of FIG. 2.

1. An UE/MS initiates any of the procedure listed in table 1. The PCO field of the request message indicates that the UE/MS supports the enhanced TFT format.

2. If the BBF understands the provided extended TFT indicator in the PCO, it applies the following logic: If the UE/MS indicates support for the extended TFT, and the network also supports this format, then the extended format will be used. If either the UE/MS or the network haven't implemented the extended TFT format, or if the UE/MS did not provide the indicator in the PCO field, then the "legacy" TFT format shall be used, i.e. a TFT format of a lower IP-version, preferably IPv4.

3. A response to the PDN connectivity request in step 1 is issued that accepts the PDN connection. If the UE/MS has indicated its support for the extended TFT format, and in addition this format is supported by the network, then an indication that the extended TFT format is supported and will be used for this PDN connection is provided in the PCO field in the response message. Otherwise, no indication or a negative indication is provided in the PCO field.

FIG. 3 shows a high level flow diagram 300 of the UE/MS functionality when the invention is used. The numbers below refer to the reference numbers indicated for the blocks in FIG. 3.

305. The UE/MS initiates any of the procedure listed in Fel! Hittar inte referenskälla. The PCO field of the request message indicates that the UE/MS supports the enhanced TFT format.

310. A positive response to the request issued in step 1 is received.

315. If the Gateway node indicates support for the extended TFT format in the PCO field in the response message, then the UE/MS will decide that the extended TFT format should be used. If the network did not indicate support for the extended TFT format, or in case the indicator was missing in the PCO field for some other reason, then the UE/MS will decide that the "legacy" TFT format must be used, i.e. a TFT format of a lower IP version, here suitably IPv4.

320. If the GW indicated support for extended TFT, then the extended TFT format is available for use in all applicable procedures for the lifetime of this PDN connection. The UE/MS may issue resource requests using the extended format.

325. If the GW did not indicate support for the extended TFT, then the legacy TFT format will be used in all applicable procedure for the lifetime of this PDN connection. The UE/MS should not issue resource requests using the extended TFT format.

FIG. 4 shows a high level flow diagram 400 of the invention at the "gateway node" end of the system. The numbers below refer to the corresponding numbers shown in the sequence diagram of FIG. 4.

405. A PDN Connectivity request is received. (Applicable for any of the procedures listed in section table 1.)

410. Given that the BBF understands the provided extended TFT indicator in the PCO, the BBF applies the following logic: If the UE/MS indicates support for the extended TFT, and in addition the network also supports this format, then the extended format will be used. If either the UE/MS or the network haven't implemented the extended TFT format, or if the UE/MS did not provide the indicator in the PCO field for some other reason, then the legacy TFT format will be used.

NOTE: Network support for the extended TFT format must be configured in each BBF if BBF relocation is a possibility, i.e. even if the BBF supports the extended format it must be guaranteed that for all "potential" BBFs that a PDN connection might be relocated to must also support the new format. If this cannot be guaranteed, then the BBF should suitably be configured to apply the legacy TFT format, i.e. in this vase IPv4.

NOTE: If the BBF does not understand the indicator itself in the PCO field (e.g. if it is an "old" BBF) then the BBF will still act according to steps 415 and 425 as this is the legacy behavior according to the 3GPP standard.

415. The BBF decides that the legacy TFT format applies. A standard response to the PDN connectivity request in step 405 is issued that accepts the PDN connection.

420. The BBF decides that the extended TFT format applies. A response to the PDN connectivity request in step 405 is issued that accepts the PDN connection. An indication that the extended TFT format is supported and will be used is provided in the PCO field in the response message to the UE/MS.

425. Legacy TFT format should be used in all applicable procedures for the lifetime of this PDN connection. The BBF should not issue network initiated resource requests (if applicable) using the extended TFT format.

430. The extended TFT format should be used in all applicable procedures for the lifetime of this PDN connection. The BBF may issue network initiated resource requests (if applicable) using the extended TFT format.

In some embodiments, the extended definition TFT definition which has been mentioned includes so called Link Local Addresses, LLAs.

The invention is not limited to the examples of embodiments described above and shown in the drawings, but may be freely varied within the scope of the appended claims.

The invention claimed is:

1. A user terminal for a wireless communications system, the user terminal being arranged to:
   establish a communications session with a gateway node in the wireless communications system according to the Internet Protocol over at least one bearer;
   provide a Protocol Configuration Option (PCO) field to the gateway node during the establishment of the session, the PCO field including an indicator that indicates that the user terminal is arranged to handle traffic to and from the gateway node using the IPv6 version of a Traffic Flow Template (TFT);
   receive a response from the gateway node to said indicator in the PCO field;
   identify an indicator in said response, said indicator indicating that the gateway node can transmit and receive messages according to said version of the TFT; and
   format messages the user terminal sends to the gateway node according to the IPv4 version of the TFT in response to determining said indicator in the PCO field is missing.

2. The user terminal of claim 1, being a User Equipment (UE) of an Evolved Packet system.

3. The user terminal of claim 1, being a Mobile Station (MS) of a General Packet Radio Service (GPRS) system.

4. The user terminal of claim 1, being further arranged to:

receive a response from the gateway node in response to the user terminal providing the PCO field, said response from the gateway node including a PCO field; and format messages the user terminal sends to the gateway node according to the IPv4 version of the TFT in response to determining that the response received from the gateway node is missing an indicator in the PCO field that indicates that the gateway node can transmit and receive messages according to the IPv6 version of the TFT.

5. A gateway node for a wireless communications system, the gateway node being arranged to:

establish a communications session according to the Internet Protocol with a user terminal in the wireless communications system over at least one bearer, the gateway node being equipped with a function for choosng the proper bearer for messages to the user terminal;

receive an indicator in a Protocol Configuration Option (PCO) field from the user terminal during the establishment of the session;

in response to determining that said indicator in the PCO field is received, use the IPv6 version of a Traffic Flow Template (TFT) when choosing the proper bearer; and format messages the gateway node sends to the user terminal according to the IPv4 version of the TFT in response to determining said indicator in the PCO field is missing.

6. The gateway node of claim 5, wherein said function for choosing the proper bearer is the Bearer Binding Function.

7. The gateway node of claim 6, being a Packet Data Network Gateway for an Evolved Packet System.

8. The gateway node of claim 6, being a Gateway GPRS Support Node for a General Packet Radio System.

9. The gateway node according to claim 5, being further arranged to:

transmit a response to the user terminal in response to the user terminal providing the PCO field, wherein in response to determining that the gateway node can transmit and receive messages according to the IPv6 version of the TFT, said response transmitted to the terminal including a PCO field that includes an indicator indicating that the gateway node can transmit and receive messages according to the IPv6 version of the TFT.

* * * * *